Patented June 10, 1930

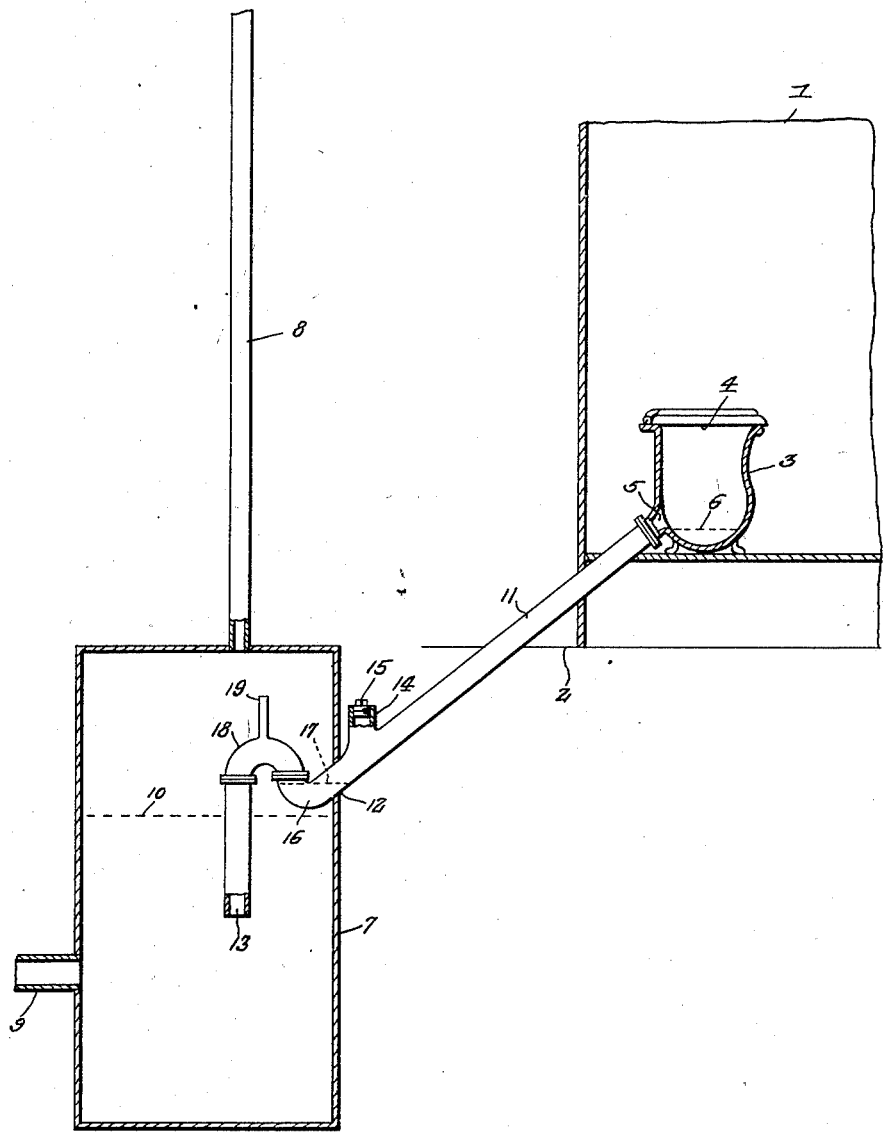

1,762,419

UNITED STATES PATENT OFFICE

WALTER D. PETTIS, OF OXFORD, MISSISSIPPI

SEWAGE-DISPOSAL FIXTURE

Application filed May 1, 1929. Serial No. 359,615.

This invention relates to a sewage disposal system and an object of the invention is to provide for draining a toilet into a settling or septic tank so as to prevent gases from escaping into the toilet, while at the same time to provide for insuring a permanent liquid seal in the system.

A further object of the invention is to provide in a manner as hereinafter set forth, a device of the character referred to, which is extremely simple in its assembly, thoroughly reliable in its operation, strong, durable, compact, and comparatively inexpensive to manufacture and install.

With the foregoing and other objects in view, the invention consists in the novel construction, combination, and arrangement of parts as will be hereinafter more specifically described and illustrated in the accompanying drawings, wherein is disclosed an embodiment of the invention, but it is to be understood that changes, variations and modifications may be resorted to, without departing from the spirit of the claims hereunto appended.

The drawing illustrates in detailed vertical section the fixture in accordance with this invention connected to a toilet bowl and a septic tank.

The invention is particularly adapted to communities where municipal sewage systems are wanting and the occupants of dwellings depend entirely upon primitive methods of disposing of sewage and waste matters from the dwellings. It is customary to provide septic or settling tanks in connection with the toilets, whereby the heavier particles of refuse are collected in the tank and the liquid portions thereof flow from said tank and are absorbed by the earth.

Bearing the foregoing in mind, and referring to the drawings, 1 indicate a portion of a dwelling or an outdoor toilet, resting upon the earth 2. Supported in the building 1 is a toilet bowl 3 having a lid 4 hingedly connected thereto at the top of a bowl. An outlet 5 is formed in the rear of the bowl, the lowest extremity of which is above the water line indicated at 6, so that the bottom of the bowl will always contain liquid to prevent the droppings from adhering to the bottom of the bowl. The bowl 3 may be flushed by any suitable means where a water supply is on hand, but in the event that there is no water supply at hand, the same may be flushed by carrying buckets of water and dumping the same into the bowl, whereby the refuse from the bottom of the bowl will be flushed through the outlet 5.

A septic tank 7 is preferably submerged below the earth 2 and particularly below the outlet from the bowl 3, so that the discharge may flow by gravity from the toilet into the tank in a manner presently to be described. The septic tank 7 is provided with a vent pipe 8 connected at the top thereof and extends into the open air a considerable distance to provide sufficient draft to carry off odors therefrom. The tank 7 is provided with an outlet conductor pipe 9, which empties directly into the earth which absorbs the liquids flowing from the tank 7. The heavier particles of material settle to the bottom of the tank, where they disintegrate or are otherwise disposed of. The water line within the septic tank after the toilet bowl has been flushed is indicated at 10.

A conductor pipe 11 is connected with the outlet 5 of the toilet bowl and extends through the opening 12 in the side of the septic tank 7. The opening 12 may be sealed about the conductor pipe 11 by cement or other well known adhesive used for the purpose. The bottom of the conductor pipe 11 or the point of discharge into the settling tank is indicated at 13, and it is to be noted that said point of discharge is below the normal water line 10 within the septic tank 7. The conductor pipe 11 is provided with an extension 14 in which is threaded a screw cap 15 for the purpose of cleaning the conductor pipe in the event that the same may become clogged.

While the extension 14 is shown in the drawings as submerged, it is within the contemplation of the invention to extend the length thereof to the surface of the earth. The angle of the conductor pipe 11 operates while at 45° with respect to the earth, but the angles thereof may be altered as circumstances require.

Adjacent the point of discharge 13, the conductor pipe is formed with the bend or angles 16, of approximately 90° so as to form a liquid seal or trap indicated at 17, by dotted lines, to prevent gases from flowing upwardly into the toilet bowl 3. The conductor 11 merges from the bend 16 in an inverted U-shaped fitting 18, having an opening or vent 19 at the highest point thereof merging within the tank 7 and above the normal liquid line 10. From the U-shaped fitting 18, the conductor pipe 11 merges into a straight vertical discharge portion and terminates into the discharge point 13 and the discharge portion is disposed vertically within the tank 7. The vent or opening 19 is for the purpose of relieving any suction that might be formed between the point of discharge 13 and the trap 17, so that the trap will not be siphoned backward into the settling tank 7.

What is claimed is:

1. In combination, an inlet pipe adapted for conducting sewage from a toilet bowl, a settling tank supported below said inlet pipe and provided with a vent pipe and an outlet pipe, a conductor pipe connected with the inlet pipe and tank, said conductor pipe having an angular contour intermediate the outlet pipe and point of discharge into said tank to provide a liquid seal for preventing backflow of gases from the settling tank and said conductor pipe further provided with an opening between the liquid seal and the point of discharge into said tank to prevent the liquid seal from diminishing its level.

2. In combination, an inlet pipe adapted for conducting sewage from a toilet bowl, a settling tank supported below said inlet pipe and provided with a vent pipe and an outlet pipe, a conductor pipe connected with the inlet pipe and tank, said conductor pipe having an angular contour intermediate the outlet pipe and point of discharge into said tank to provide a liquid seal for preventing backflow of gases from the settling tank and said conductor pipe further provided with an opening between the liquid seal and the point of discharge into said tank to prevent the liquid seal from diminishing its level, said opening located within the septic tank and above the angular contour.

3. In combination, an inlet pipe adapted for conducting sewage from a toilet bowl, a settling tank supported below said inlet pipe and provided with a vent pipe and an outlet pipe, a conductor pipe connected with the inlet pipe and tank, said conductor pipe having an angular contour intermediate the outlet pipe and point of discharge into said tank to provide a liquid seal for preventing backflow of gases from the settling tank and said conductor pipe further provided with an opening between the liquid seal and the point of discharge into said tank to prevent the liquid seal from diminishing its level, said opening located within the septic tank and above the angular contour, and a removable cap connected to the conductor pipe for the purpose of cleaning the same.

In testimony whereof I affix my signature.

WALTER D. PETTIS.